United States Patent [19]

Nakatamari et al.

[11] Patent Number: 4,757,957
[45] Date of Patent: Jul. 19, 1988

[54] TAPE CARTRIDGE

[75] Inventors: Shunji Nakatamari, Suita; Shinichi Kagano, Kyoto; Takashi Sumida, Takatsuki, all of Japan

[73] Assignee: Hitachi Maxell, Ltd., Osaka, Japan

[21] Appl. No.: 938,605

[22] Filed: Dec. 5, 1986

[30] Foreign Application Priority Data

Dec. 6, 1985 [JP] Japan ................. 60-275732

[51] Int. Cl.⁴ .................. G11B 15/32; G03B 1/04
[52] U.S. Cl. .................................. 242/198
[58] Field of Search ................. 242/197–200; 360/132

[56] References Cited

U.S. PATENT DOCUMENTS

| | | | |
|---|---|---|---|
| 4,288,048 | 9/1981 | Sieben | 242/198 |
| 4,604,671 | 6/1986 | Oishi | 242/198 X |
| 4,660,784 | 4/1987 | Sumida et al. | 242/198 |

Primary Examiner—David Werner
Attorney, Agent, or Firm—Birch, Stewart, Kolasch & Birch

[57] ABSTRACT

A tape cartridge for use in an audio digital recording system comprising a hub locking mechanism including a hub locking plate mounted in a case body for moving between a locking position and unlocking position with a spring means for biasing said the locking mechanism, a securing portion of the spring means secured to the case body and arm portions of the spring means engaged with both lateral sides of the hub locking plate in a symmetrical manner.

3 Claims, 6 Drawing Sheets

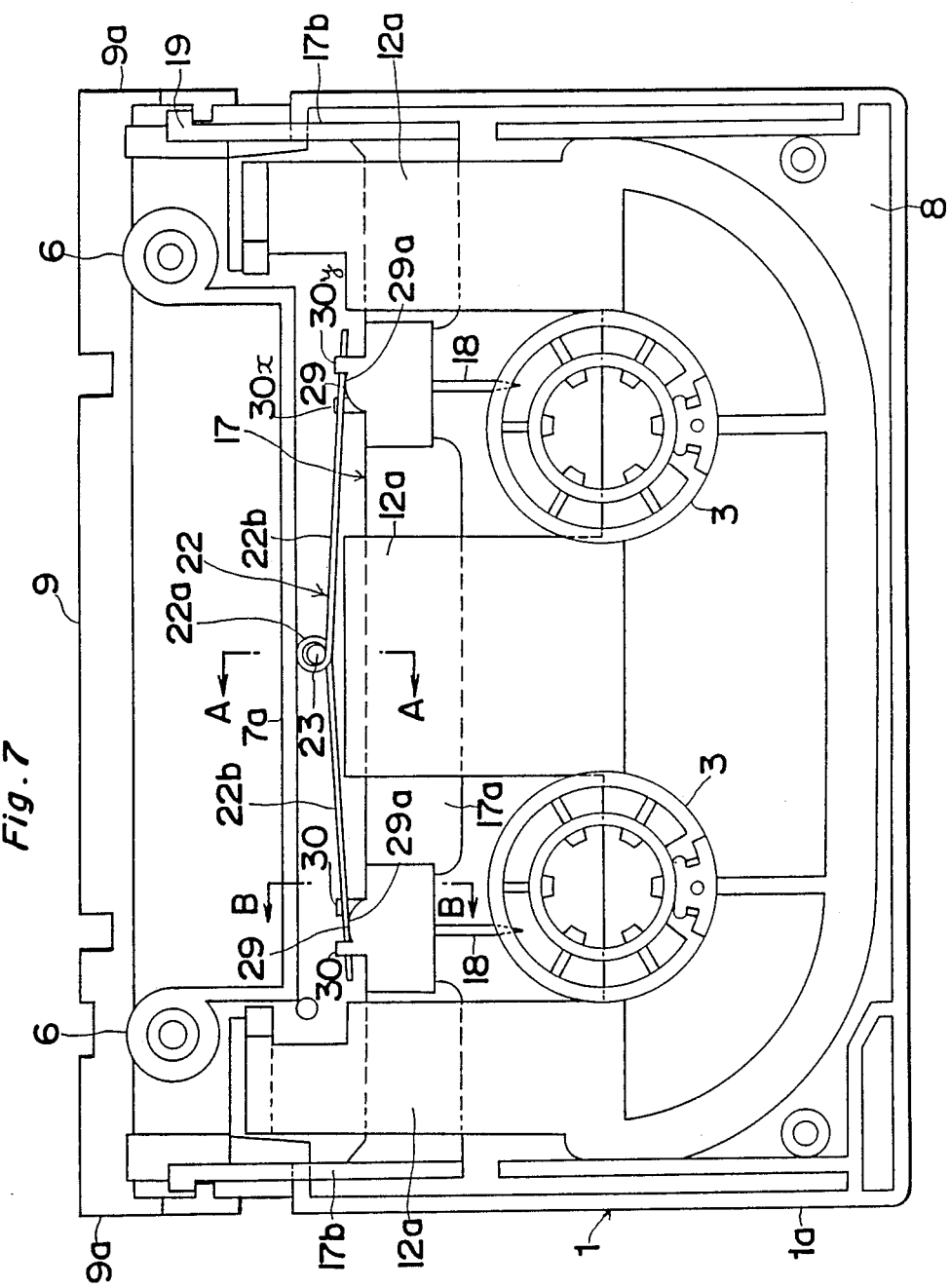

4,757,957

TAPE CARTRIDGE

BACKGROUND OF THE INVENTION

1. Field of the Invention

The present invention relates to a tape cartridge comprising a novel locking mechanism for locking tape hubs when not in use and more particularly to a tape cartridge wherein the locking mechanism is characterized by suspended spring members.

2. Description of the Prior Art

FIGS. 1 to 6 show an example of a conventional digital audio tape cartridge as disclosed in Japanese Patent Publication Serial No. 191102/1984.

Referring to FIGS. 1 and 2, a case body 1 is formed by combining a top half 1a and a bottom half 1b made of plastic resin material in an abutting manner using screws. There are disposed a pair of tape hubs 3 at both the left and right positions in the case body 1 for winding a recording tape 2 therearound. Both of the hubs 3 are rotatably disposed at a pair of drive shaft insertion holes 5 defined in the bottom wall 4 of the bottom half 1b of the case body 1. A pair of tape guide members 6 are provided at both right and left positions of the front portion of the case body 1. The recording tape 2 is released from one of the hubs and taken up on the other hub running along the tape guide members 6. A viewing window 11 is opened on the top wall 8 of the top half 1a so as extending in the left and right directions of the case body 1 and a transparent plate 12 is fitted in the viewing window 11 by way of ultrasonic bonding so as to cover the window 11. The window enables one to see the volume of the roll of the recording tape wound on the respective hubs.

In FIGS. 3 and 4, a pocket 7 for tape loading is defined in the front central portion of the bottom half 1b extending inward and in the left and right directions. The top portion of the pocket 7 is closed by the front part of the top wall 8 of the top half 1a with the front portion and bottom portion thereof opened.

A front lid 9 is rotatably mounted to the front face of the case body 1 for the protection of the front part of the recording tape. The front lid 9 can be rotated between a closed position to close the front portion of the case body 1 when not in use and an opened position to open the front portion of the case body when the tape cartridge is in use around a pair of supporting shafts 10. The front lid 9 is provided with the pair of supporting shafts 10 projected from side arms 9a and the supporting shafts 10 are rotatably fitted in the front portion of the side walls 13 of the case body 1.

In FIGS. 3 to 5, a shutter 14 for opening and closing the pocket 7 is slidably mounted on the outside of the bottom wall 4 of the bottom half 1b so as to move in the front and back directions of the case body 1. The shutter 14 is normally biased toward the closing position by a spring member 25.

A hub blocking plate 17 is mounted in the case body 1 for stopping the rotation of the hubs 3 when not in use. The hub blocking plate 17 is made of a plastic resin material and comprises an elongated flat plate 17a, sliding legs 17b projected downwardly from both left and right ends of the flat plate 17a, a pair of locking tips 18 projected backward from the back edge of the flat plate 17a at both left and right ends and passive projections 19 each projected from the free end of each of the sliding legs 17b. In case of mounting the hub locking plate 17 in the case body 1, a hub locking plate 17 is fitted in the gap between one of the inner surfaces of the top half 1a and a hub locking pressure plate 12a projected from the transparent plate 12, so as to slide in the front and back directions. When the top half 1a and bottom half 1b are assembled, the hub locking plate 17 can be installed in the front portion of the hubs 3 in such a manner that the hub locking plate 17 can bridge over the hubs 3 and recording tape 2, wound on the hubs 3 in the left and right directions in the bottom half 1b, and the sliding legs 17b are slidably supported on the inner face of the bottom wall 4. Thus, the hub locking plate 17, installed in the case body 1, can move between the locking position, where each locking tip 18 engages with one of the engaging teeth formed on the peripheral edge of the top of the hub, and an unlocking position where the engaging tips are disengaged from the engaging teeth and the hub locking plate 17 is normally baised toward the locking position by a spring member 22 suspended between the rib 7a projected in the left and right directions in the inner portion of the case body 1 and the flat plate 17a. Therefore, when not in use, the hub locking plate 17 makes the locking tips 18 engage with the hubs 3 to stop the hubs 3 and when the tape cartridge is loaded in a tape player, the hub locking plate 17 is moved toward the unlocking position by engagement of the passive projection 19 and the hub locking plate 17 upon opening of the front lid 9, due to the operation of the tape player.

In the digital audio tape cartridge having the conventional hub locking mechanism mentioned above, a coil spring has been used as the spring member 22 for biasing the hub locking plate 17, and the intermediate portion 22a of the spring member 22 is secured to a spring supporting member 23 formed at the intermediate position of the hub locking plate 17, and the arm portions 22b, projected from the intermediate portion 22a, resiliently abut the rib 7a. However, the way of suspending the spring member, as mentioned above, has a drawback in that the spring member 22 pushes the central portion of the hub locking plate 17 with a force F and the locking tips 18 of the hub locking plate 17 engage the hubs 3, therefore, the hub locking plate 17 is subjected to a strong bending moment, as shown in FIG. 6, whereby the hub locking plate 17 may be deformed, in particular under a hot condition, whereby the hub locking plate 17 tends to be worn away from the locking and unlocking. In the worst case only one locking tip 18 of the hub locking plate 17 will engage the hub with the other locking tip 18 being unlocked, causing incomplete locking.

SUMMARY OF THE INVENTION

Therefore, it is an object of the present invention to provide a tape cartridge having a reliable hub locking mechanism.

Another object of the present invention is to provide a hub locking mechanism which is not easily deformed.

A further object of the present invention is to provide a hub locking mechanism of the tape cartridge which prevents scratching between the hub locking mechanism and the inner surface of the case body.

In order to accomplish the objects, according to the present invention, there is provided a tape cartridge comprising a case body, hubs rotatably accommodated in the case body for winding a recording tape, and a hub locking mechanism mounted in the case body for moving between a locking position and unlocking position with spring means for biasing the locking mechanism, the spring means being provided with a securing portion and arm portions, suspended between the case body and a hub locking plate for detachably engaging with the hubs, characterized in that the securing portion of the spring means is secured to the case body, and the arm portions are engaged with both lateral sides of the hub locking plate in a symmetrical manner.

BRIEF EXPLANATION OF THE DRAWINGS

FIG. 7 is a top plan view showing the inside of the digital audio tape cartridge according to the present invention with the top half removed.

DETAILED DESCRIPTION OF THE PREFERRED EMBODIMENTS

Figure 1:
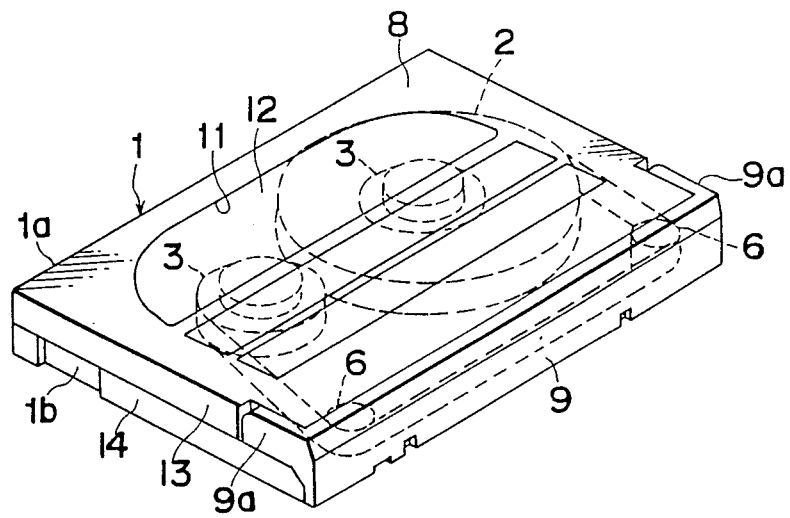
FIG. 1 is an outside perspective view of a conventional digital audio tape cartridge.
Figure 2:
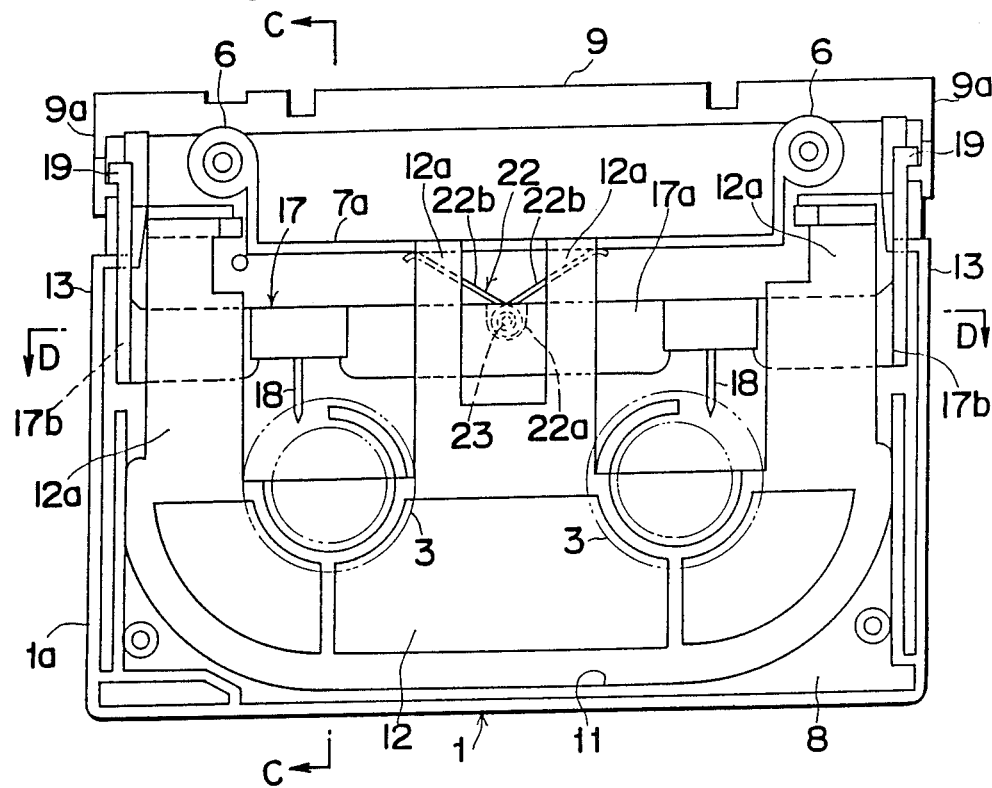
FIG. 2 is a plan view showing the inside of the conventional digital audio tape cartridge shown in FIG. 1.
Figure 3:
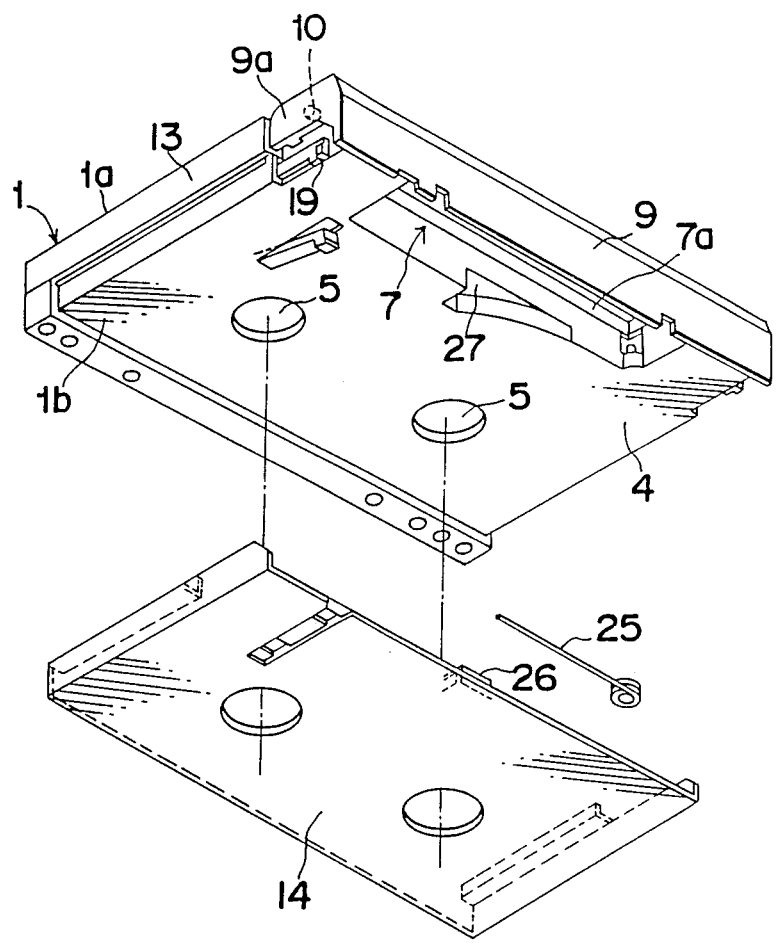
FIG. 3 is a perspective view of the conventional digital audio tape cartridge with the top half and bottom half separated.

Before the description proceeds, it is noted that the like parts to those shown in FIGS. 1 to 6 are numbered by like reference numerals and the details therof are herein omitted. Since the general structure of the tape cartridge 1 and the general structure of the hub locking plate 17 are similar to those shown in FIGS. 1 to 6, only the different features of suspending the spring member 22 of the hub locking plate 17 is hereinafter explained.

The spring member 22 is formed of a coil spring member, comprising an intermediate securing portion 22a which is secured to the case body 1 and acts as the main coil spring portion and arms 22b projecting from the securing portion 22a.

Figure 8:
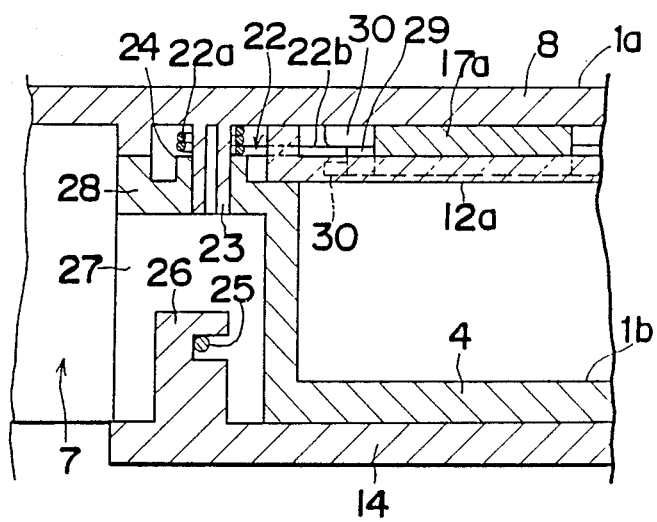
FIG. 8 is a partial cross sectional view showing an essential portion of the tape cartridge according to the present invention.

The securing portion 22a of the spring member 22 is supported by a supporting shaft 23 projected from the inner surface of the top wall 8 of the top half 1a at a position between the front portion of the central part with respect to the left and right directions and the rib 7a formed in front of the hub locking plate 17 so as to extend in the left and right directions. The supporting shaft 23 can be combined with a boss 24 projected from the inner face of the bottom half 1. The location on the bottom half 1b where the boss 24 is projected corresponds to the location on the top wall 28 of a recessed portion 27 for avoiding the interference with a spring support 26, as shown in FIG. 8.

The respective intermediate portions of the arms 22b of the spring member 22 are adapted to be engaged with respective U shaped hooks 29 formed at both side end portions of the hub locking plate 17. Each of the hooks 29 is formed at the opposite side of the locking tip 18 and the two legs of the U shaped hook are situated generally symmetrical with the locking tip 18, as clearly shown in FIG. 7. In addition, the inside portion 29a of the hook 29 is formed in a round shape in plan view so as to enable a point contact between the arm 22b and hook 29 to decrease friction therebetween. Both of the legs 30 are projected at a different level in a vertical direction. Namely one of the legs is projected from the top level portion of the hub locking plate 17 and the other leg is projected from the bottom level portion of the hub locking plate 17. Two legs 30 of the U shaped hook 29 are adapted to clamp the arm 22b in such a manner that an inner portion of the arm 22b rides over the inner leg 30x and the outer portion of the arm 22b is inserted below the outer leg 30y. The legs 30 are formed slightly displaced in both right and left or lateral directions in order to avoid formation of an undercut shape. Also there is formed a round surface 30a on the inner side of the free end portion of the leg 30 so as to facilitate sliding motion of the arm when the arm 22b is inserted in the hook 29.

Figure 6:
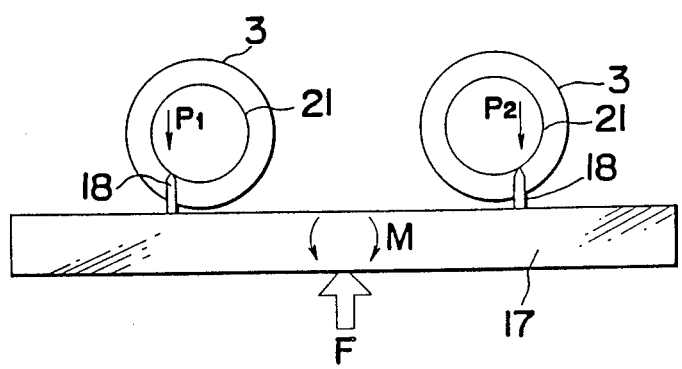
FIG. 6 is a top plan view showing a way of locking the hubs by the hub locking plate used in the conventional digital audio tape cartridge.
Figure 4:
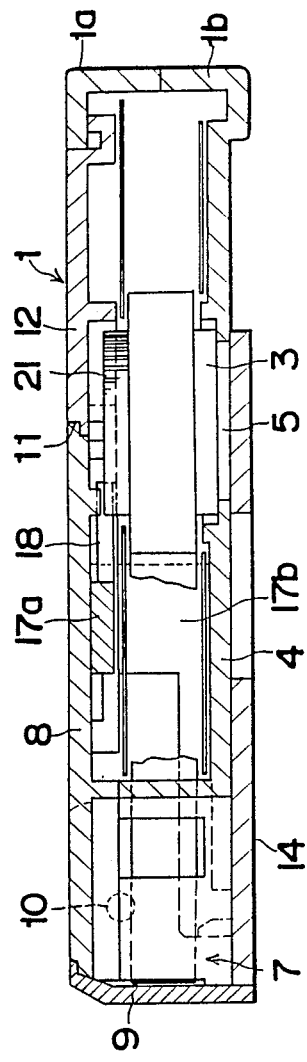
FIG. 4 is a cross sectional view taken along the lines C—C in FIG. 2.
Figure 5:
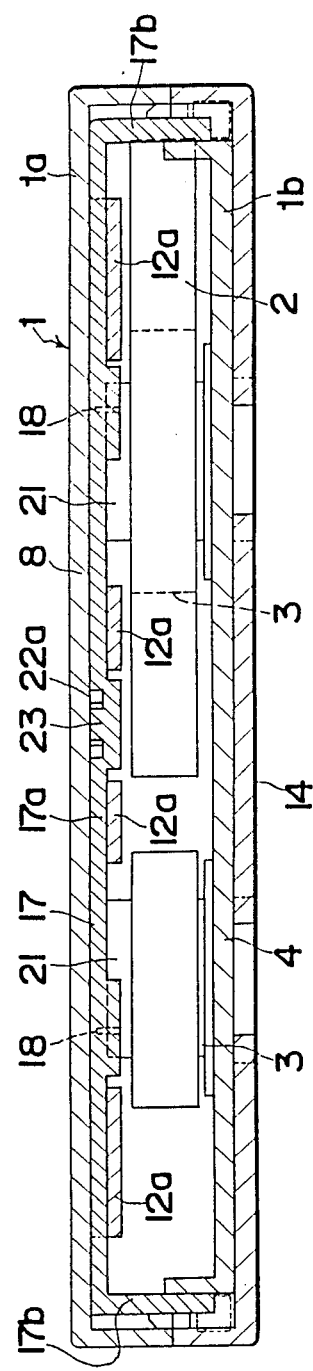
FIG. 5 is a cross sectional view taken along the lines D—D in FIG. 2.
Figure 9:
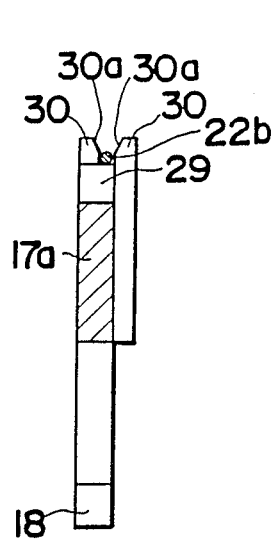
FIG. 9 is a partial side view of the hub locking plate according to the present invention.

In the arrangement mentioned above, since the acting point of the spring member occurs at the respective positions of the hub locking plate 17, opposite to and symmetrical with the locking tip 18, the hub locking plate 17 is prevented from receiving a bending moment, as explained in FIG. 6, whereby the hub locking plate 17 is prevented from being deformed by the force applied from the spring member 22. Moreover, since both the left hand and right hand of the hub locking plate 17 can be pressed in the front direction with equal force, both of the engaging tips 18 can evenly engage with the hubs 3 respectively, whereby locking of the hubs can be assured.

Moreover, in mounting the hub locking plate 17 in the disc cartridge, after the hub locking plate 17 and transparent plate 12 are mounted in the top half 1a, the transparent plate 12 is secured to the top half 1a by ultrasonc welding, and then the spring member 22 is mounted in position. In this way, it is possible to prevent displacement of the hub locking plate 17 upward by the force of the spring member 22, thereby facilitating positioning of the various parts including the positioning of the transparent plate.

Moreover, since the arms 22b of the spring member 22 can slidably engage with the hooks 29 preventing undesired engagement of the free ends of the arms 22b with hub locking plate 17 and inner surface of the top half 1a, it is possible to prevent occurrence of dust which may be caused by the scratching between the free ends of the arms 22b and the hub locking plate 17 or inner surface of the top half or bottom half, therefore, the arrangement of the locking device, according to the present invention, is effective to suppressing various bad effects such as drop out of the signal.

Figure 10:
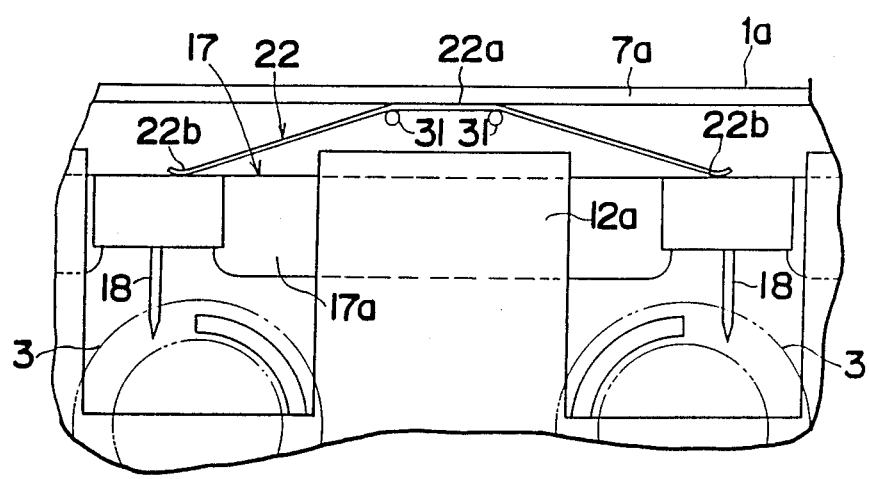
FIG. 10 is a partial plan view showing an essential portion of the hub locking plate according to the present invention.
Figure 11:
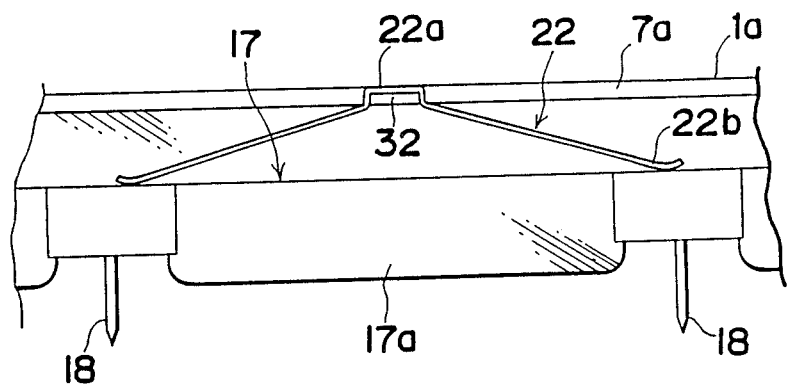
FIG. 11 is a partial plan view of another embodiment of the hub locking plate according to the present invention.

FIGS. 10 and 11 show the modifications of the hub locking mechanism according to the present invention. As shown in FIGS. 10 and 11, the spring member 22 may be formed by bending a spring plate in a generally V character shape. In the modification shown in FIG. 10, the securing portion 22a of the spring member 22 is secured by inserting the securing portion 22a in a space between securing pins 31 and the rib 7a. In FIG. 11, the securing portion 22a is bent in a rectangular shape, which is inserted in a recess 32 defined in the rib 7a. In both cases, the intermediate portions of the spring member extend toward the back of the hub locking plate 17 with the free ends of the spring member 22 contacting with the surface of the hub locking plate 17 opposite to the locking tips 18. Thus the same effects as mentioned above can be obtained.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tape cartridge comprising a case body, hubs rotatably accommodated in the case body for winding a recording tape, a hub locking mechanism including a plastic hub locking plate mounted in said case body for moving between a locking position and an unlocking position, and a spring member for biasing said locking mechanism, said spring member being provided with a securing portion and arm portions suspended between said case body and said hub locking plate for detachably engaging with said hubs, said securing portion of said spring member being secured to said case body and said arm portions being engaged with both lateral sides of said hub locking plate in a symmetrical manner, said hub locking plate being provided with a pair of locking tips projected from said hub locking plate toward said hubs and said arm portions of said spring member being engaged with surfaces of said hub locking plate substantially opposite said locking tips.

2. The tape cartridge according to claim 1, wherein said hub locking plate is provided with a pair of legs projected from said hub locking plate at different levels for engagement with said arm portions of said spring member.

3. The tape cartridge according to claim 2, wherein each of said legs is provided with a round surface for guiding said arm portions of said spring member for engaging said arm portions with said legs.

* * * * *